US007928865B2

(12) United States Patent
Hofmann et al.

(10) Patent No.: US 7,928,865 B2
(45) Date of Patent: Apr. 19, 2011

(54) METHOD AND APPARATUS FOR EMBEDDING SECOND CODE INTO OPTICAL DISC DATA BY DATA MODULATION RULE VARIATION

(75) Inventors: Holger Hofmann, Thousand Oaks, CA (US); Alan Bruce Hamersley, Newbury Park, CA (US); John Matthew Town, Ojai, CA (US)

(73) Assignee: Thomson Licensing, Boulogne-Billancourt (FR)

( * ) Notice: Subject to any disclaimer, the term of this patent is extended or adjusted under 35 U.S.C. 154(b) by 202 days.

(21) Appl. No.: 12/308,281

(22) PCT Filed: Jun. 12, 2006

(86) PCT No.: PCT/US2006/022921
§ 371 (c)(1),
(2), (4) Date: Dec. 11, 2008

(87) PCT Pub. No.: WO2007/145622
PCT Pub. Date: Dec. 21, 2007

(65) Prior Publication Data
US 2010/0188272 A1   Jul. 29, 2010

(51) Int. Cl.
*H03M 5/00* (2006.01)
(52) U.S. Cl. ...................................... 341/58; 369/59.24
(58) Field of Classification Search .................... 341/58; 369/59.24; 714/736, 755; 375/260, 259, 375/350
See application file for complete search history.

(56) References Cited

U.S. PATENT DOCUMENTS

| | | | |
|---|---|---|---|
| 3,716,851 A * | 2/1973 | Neumann | 341/67 |
| 5,485,469 A * | 1/1996 | Suzuki | 714/774 |
| 6,487,155 B1 | 11/2002 | Carson et al. | |
| 6,839,312 B2 | 1/2005 | Heylen et al. | |
| 7,184,093 B2 | 2/2007 | Manning | |
| 7,184,544 B2 | 2/2007 | Ramey et al. | |
| 2002/0060634 A1 | 5/2002 | Shim | |
| 2002/0159367 A1 * | 10/2002 | Ahn | 369/59.24 |
| 2005/0185542 A1 | 8/2005 | Iwase | |

FOREIGN PATENT DOCUMENTS

| | | |
|---|---|---|
| EP | 1469473 | 10/2004 |
| EP | 1600964 | 11/2004 |
| EP | 1594133 | 11/2005 |
| EP | 1596388 A1 | 11/2005 |
| JP | 04206786 | 7/2004 |
| WO | WO9963671 | 12/1999 |
| WO | WO0161695 | 8/2001 |
| WO | WO 02/41316 A1 | 5/2002 |
| WO | WO2004044912 | 5/2004 |

OTHER PUBLICATIONS

International Search Report, dated Mar. 12, 2007.

* cited by examiner

*Primary Examiner* — Joseph Lauture
(74) *Attorney, Agent, or Firm* — Robert D. Shedd; Robert B. Levy (57) ABSTRACT

There are provided a method and apparatus for embedding a second level code into a first level code of an optical disc by data modulation rule variation. The apparatus includes a multi-level, varying rule based modulator (199) for modulating the first level code to obtain a channel bit stream representative of the first level code and having the second level code embedded therein. The multi-level, varying rule based modulator modulates the first level code using modulation rules respectively having different statistical properties of pit-land length distributions that preserve a readability of the first level code and that are distinguishable at readout of the optical disc. The different statistical properties represent binary or multilevel data of the second level code.

20 Claims, 5 Drawing Sheets

METHOD AND APPARATUS FOR EMBEDDING SECOND CODE INTO OPTICAL DISC DATA BY DATA MODULATION RULE VARIATION

FIELD OF THE INVENTION

This application claims the benefit, under 35 U.S.C §365 of International Application PCT/US 2006/022921 filed Jun. 12, 2006, which was published in accordance with PCT Article 21(2) on Dec. 21, 2007 in English.

BACKGROUND OF THE INVENTION

Different prior art approaches have been implemented to embed a second level code into the bit stream of an optical disc. However, these prior art approaches sacrifice on the readability of the main data in the first level code, so that the existence of a second level code can be estimated based on the easy detection of specific error patterns in the first level code.

SUMMARY OF THE INVENTION

These and other drawbacks and disadvantages of the prior art are addressed by the present invention, which is directed to a method and apparatus for embedding a second level code into optical disc data based on data modulation rule variation.

According to an aspect of the present invention, there is provided an apparatus includes a modulator for modulating a first code to obtain a channel bit stream representative of the first code and having a second code embedded therein. The modulating enables different length distributions of first and second encoding regions representing binary or multilevel data of the second code.

According to another aspect of the present invention, there is provided a method for modulating a first code to obtain a channel bit stream representative of the first code and having a second code embedded therein. The modulating uses different length distributions of first and second encoding regions representing binary or multilevel data of the second code.

These and other aspects, features and advantages of the present invention will become apparent from the following detailed description of exemplary embodiments, which is to be read in connection with the accompanying drawings.

BRIEF DESCRIPTION OF THE DRAWINGS

The present invention may be better understood in accordance with the following exemplary figures, in which.

DETAILED DESCRIPTION

The present invention is directed to a method and apparatus for embedding a second level code into optical disc data based on data modulation rule variation.

The present description illustrates the principles of the present invention. It will thus be appreciated that those skilled in the art will be able to devise various arrangements that, although not explicitly described or shown herein, embody the principles of the invention and are included within its spirit and scope.

All examples and conditional language recited herein are intended for pedagogical purposes to aid the reader in understanding the principles of the invention and the concepts contributed by the inventor to furthering the art, and are to be construed as being without limitation to such specifically recited examples and conditions.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. It is thus regarded that any means that can provide those functionalities are equivalent to those shown herein.

Figure 1:
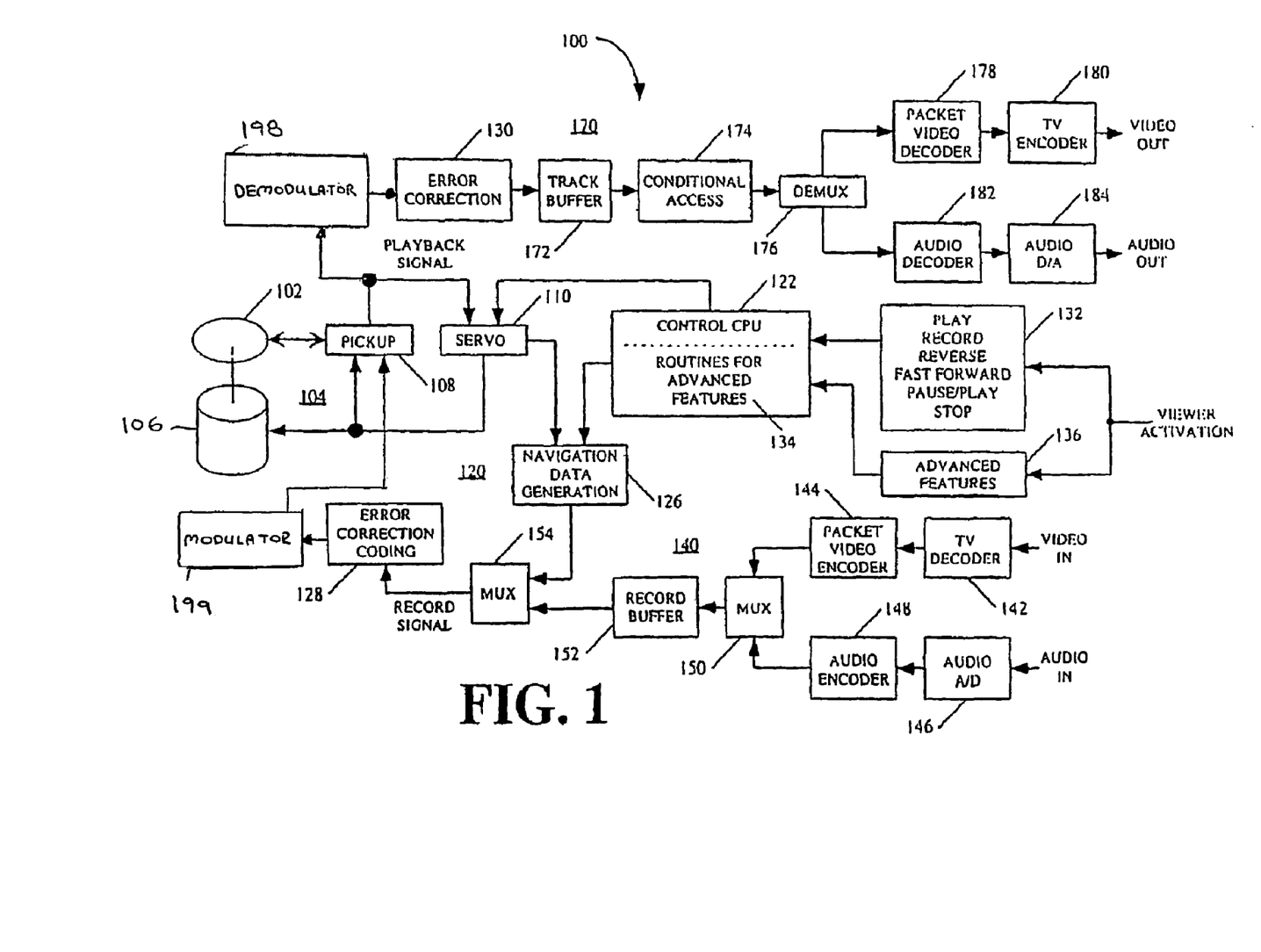
FIG. 1 is a diagram for an exemplary Digital Versatile Disc (DVD) recorder to which the present principles may be applied.

Turning to FIG. 1, an exemplary Digital Versatile Disc (DVD) recorder to which the present principles may be applied is indicated generally by the reference numeral 100. The DVD recorder 100 utilizes a recordable disk medium 102. The disk medium 102 is embodied as a DVD in the illustrated embodiment. In many instances, as will be noted, the disk medium can also be, for example, a compact disc (CD), a high definition digital versatile disc (HD DVD), a Blue Ray DVD, and so forth. Moreover, as is readily apparent to one of ordinary skill in this and related arts, the present principles are not applicable to optical disc recorders, but also to systems used for creating masters for read only memory discs, e.g., DVD-ROM. This so-called LBR (laser beam recorder) is similar to the illustrated recorder in FIG. 1, but obtains the record signal feed into block 128 from a hard disc drive.

The DVD recorder 100 is capable of writing onto and reading from recordable DVD media, in this example, a DVD 102. The device comprises a mechanical assembly 104, a control section 120, a video/audio input processing path 140, and a video/audio output processing path 170. The allocation of most of the blocks to different sections or paths is self-evident, whereas the allocation of some of the blocks is made for purposes of convenience and is not critical to understanding the operation of the device.

The mechanical assembly 104 includes a motor 106 for spinning the disk 102 and a pickup assembly 108 that is adapted to be moved over the spinning disk. The pickup 108 and the motor 106 are controlled by a servo 110. The servo 110 can receive a playback signal of data which can be read from a spiral track of the disk 102 as a first input. The playback signal also can be an input to an error correction circuit 130, which can be considered part of the control section or part of the video/audio output processing path.

When reading data from the disk 102, a laser on the pickup assembly 108 can direct laser light at an interior layer surface of the disk 102. Depending upon the data stored on the disk 102, the laser light can be mostly reflected or mostly absorbed. The pickup assembly 108 can interpret reflected light as one type of electrical signal while light absorbed by the interior layer surface of the disk 102 can be interpreted as a second type of electrical signal. In the preferred embodiment, transitions between reflectivity and non-reflectivity are mapped to a digital signal referred to as the playback signal which corresponds to the data stored on the disk 102.

By comparison, during recording; a laser on the pickup assembly burns spots onto a spiral track on the disk 102 in order to digitally record video and/or audio program material. More particularly, the disk 102, which can include at least one Interior crystalline recording layer, can exhibit two distinctive states, amorphous or crystalline, each having different reflectivity characteristics. Those different levels of reflectivity can be detected by optical sensors in the pickup assembly 108.

Prior to recording, the interior recording layer of the disk 102 is in a crystalline state exhibiting high reflectivity. The light intensity of a laser beam can be modulated to write amorphous data marks on the surface of tracks in the interior crystalline recording layer. Specifically, the energy of a laser pulse can quickly raise the surface temperature of the interior crystalline recording layer above the layer melting point. Once above the melting point, the interior layer can transition from a crystalline state of high reflectivity to an amorphous state of low reflectivity. Subsequently, the rapid cooling of the layer prevents the molecular structure of the interior layer from reorganizing into a crystalline state. Hence, digital data can be mapped to a series of laser pulses which can write a digital code to the disk 102 which can correspond to the digital data.

Notably, depending upon capacity requirements, the disk 102 can have either one or two recordable sides. Additionally, the disk 102 can have multiple recordable layers per side. However, for purposes of understanding the invention, the number of sides and layers is irrelevant. Moreover, in the event of a double-sided recording, it also is irrelevant whether the recording of both sides of the disk 102 occurs from one or both sides of the disk 102.

Returning now to FIG. 1, the control section 120 preferably includes a controller 122 and a navigation data generation circuit 126. The controller 122 supplies a first input signal to the navigation data generation circuit 126 and the servo 110 supplies a second input signal to the navigation data generation circuit 126. The servo can also be considered part of the control section 120. The navigation data generation circuit 126 supplies a first input signal to the multiplexer (MUX) 154, which forms part of the video/audio input processing path 140. The output of the MUX 154 is an input to an error correction coding circuit 128. The output of the error correction coding circuit 128 is a recordable input signal supplied to the pickup 108, which will be "burned" onto the spiral track of the disk 102 by the laser.

The controller 122 also preferably has access to the data included in the track buffer 172 and record buffer 152 as shown in FIG. 1. The controller 122 can delete, modify, and reformat video data stored in the track buffer 172 and record buffer 152 for the purpose of implementing the inventive arrangements. Control and data interfaces are also preferably provided for permitting the controller 122 to control the operation of packet video encoder 144 and audio encoder 148. Suitable software or firmware is provided in memory for the conventional operations performed by controller 122. In addition, program routines for the advanced features 134 are provided for controlling the controller 122.

A control buffer 132 for functions capable of being activated by a user indicates functions such as, e.g., play, record, reverse, fast forward, pause/play and stop. The pause is a counterpart to pause operation in a VCR, for example manually interrupting the play back of a prerecorded program or interrupting the recording of a viewed program to eliminate commercials from the recording. A separate pause buffer 136 is provided to receive commands for performing the pause during record and playback function.

The video/audio input processing path 140 is a signal processing circuit for converting a conventional television signal, for example NTSC or PAL, into digitized packet data, for example MPEG-1 or MPEG-2, for digital recording by the DVD recorder 100. The input path 140 includes an NTSC decoder 142 and video encoder, for example MPEG-1 or MPEG-2, 144 for video in, and includes an audio analog-to-digital converter (ND) 146 and an audio encoder, for example MPEG-1 or MPEG-2, 148. The digitized signals are combined in a multiplexer 150 and stored in a record buffer 152 until an entire packet has been constructed. As each packet is constructed, each packet is combined with the output of the navigation data generation circuit in the MUX 154 and sent to the error correction coding circuit 128. Error correction coding circuit 128 can also be deemed to be part of the input path 140.

The output processing path 170 includes a track buffer, or output buffer, 172, in which data read from the disk is assembled into packets for further processing. The packets are processed by conditional access circuit 174 that controls propagation of the packets through demultiplexer 176 and into respective paths for video and audio processing. The video is decoded by decoder 178; for example from MPEG-1 or MPEG-2, and encoded as a conventional television signal by TV encoder 180, for example NTSC or PAL. The audio is decoded by circuit 182, for example MPEG-1 or MPEG-2, and converted to analog form by audio digital-to-analog (D/A) converter 184. The output processing path 170 can be deemed to include the error correction circuit 130, as noted.

The DVD recorder 100 can represent a machine having, for example, but not limited to, a 1x read and 1x write capability. Such devices can typically have maximum data rates for recording or playing back of approximately 11 megabits/second.

A multi-level, varying rule based modulator 199 and/or demodulator 198 implements the varying rules based modulation in accordance with the present principles, so as to embed a second level code into the first level code of the optical disc. As is shown, the modulator is disposed between the error correction coding circuit 128 and pickup 108, and the demodulator 198 is disposed between the pickup 108 and the error correction circuit 130. The modulator 199 includes an input for inputting the second level code, and the demodulator 198 includes an output for second level code.

As noted above, the present principles are directed to a method and apparatus for embedding a second level code into the user data (main data) of an optical disc. Advantageously, in accordance with the present principles, the second level code is lost if the optical disc is copied with an optical drive or is reproduced by a professional pirate on the user data level. Thus, the absence of the second level code may be used to indicate that an optical disc is illegitimate such as in the case of a pirated copy. In contrast to prior art approaches relating to embedding a second level code on an optical disc, embodiments in accordance with the present principles embed the second level code without affecting a readability of the first level code (main data).

The present principles utilizes specific sets of rules to convert (modulate) data bytes into a channel bit stream, which is the sequence of pits and lands on an optical disc. In accordance with the present principles, different statistical properties of pit-land length distributions may be used to embed a second level code into the data, without changing the readability performance of the first level code since the proposed sets of modulation rules are compatible with the demodulation process used in standard optical disc drives.

In some embodiments, predetermined sections of the bit stream are encoded with different modulation rule sets, which can be distinguished at readout by their different statistical properties. The different statistical properties represent binary or multilevel second level data. The different sets of modulation rules are constructed in a way to change the statistical distribution of pit/land lengths.

All channel codes for optical discs provide a certain degree of redundancy to control the DC component of the bit sequences. Such DC component control is used to guarantee reliable data detection and a sufficient differential phase tracking signal for all possible bit combinations. This redundancy can also be used to select codewords with specific statistical run length distribution properties representing the second level data. The differentiation between the two sets of modulation rules at readout can be accomplished, for example, by counting the occurrence of 3T symbols in a fixed bit stream length, in the case when the modulation rules in accordance with the present principles maximize or minimize the 3T occurrence in the bit stream.

The modification to be performed for an optical disc (such as, e.g., a DVD) to obtain two distinct run length distributions for each synchronization (sync) frame can be implemented using the following procedure. Every time there is a choice between primary and secondary synchronization (sync) code tables or between state 1 and 4, it shall be determined which one produces more 3T symbols in the bit stream. If the second level code bit is 0, then the case with the higher number of 3T symbols is chosen. If the second level code bit is 1, then the case with the lower number of 3T symbols is chosen. If the number of 3T symbols is the same for both cases, then the usual Digital Sum Value (DSV) control rules are applied as specified. Since most of the time the number of 3T symbols is the same for both cases, the DSV control still works sufficiently. The preceding procedure is further described with respect to FIG. 2.

The detection reliability of a single second level code bit depends on the length of the bit, such that the longer the bit length, the higher the bit detection reliability. In some embodiments, an appropriate error correction code can be included into the second level code.

Figure 2:
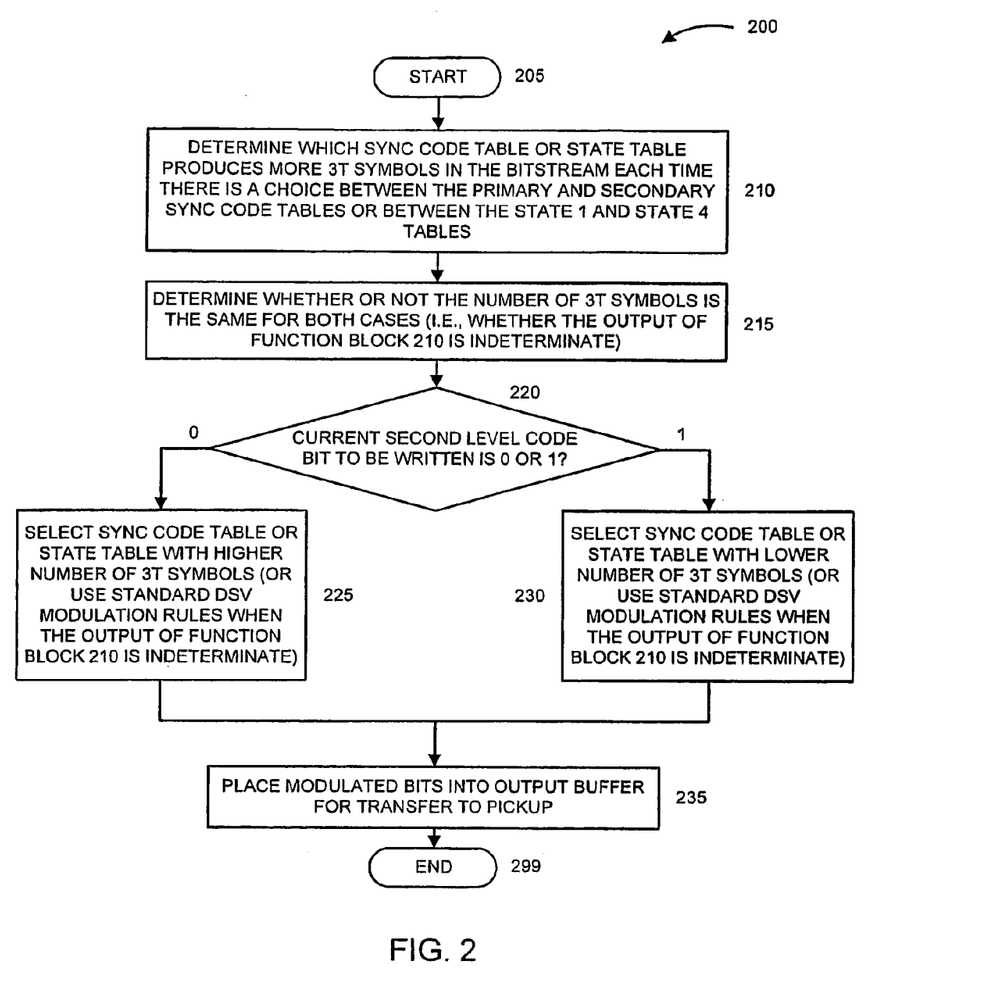
FIG. 2 is a diagram for an exemplary method for encoding second level data on an optical disc without altering the readability of the first level data (main data) in accordance with the present principles.

Turning to FIG. 2, an exemplary method for encoding second level data on an optical disc without altering the readability of the first level data (main data) is Indicated generally by the reference numeral 200. The method 200 results in the generation of binary code for representing the second level data.

The method 200 includes a start block 205 that passes control to a function block 210. The function block 210 determines which sync code table or state table produces more 3T symbols in the bitstream each time there is a choice between the primary and secondary sync code tables or between the state 1 and state 4 tables, and passes control to a function block 215. The function block 215 determines whether or not the number of 3T symbols is the same for both cases (i.e., whether the output of the function block 210 was indeterminate), and passes control to a decision block 220. The decision block 220 determines whether or not a current second level code bit to be written is a zero (0) or a one (1). If the current second level code bit to be written is a zero, then control is passed to a function block 225. Otherwise, if the current second level code bit to be written is a one, then control is passed to a function block 230. It is to be appreciated that the second level code may optionally include error correction code.

The function block 225 selects the sync code table or the state table with the higher number of 3T symbols (or uses the standard Digital Sum Value (DSV) modulation rules when the output of the function block 210 is indeterminate), and passes control to the function block 235.

The function block 230 selects the sync code table or the state table with the lower number of 3T symbols (or uses the standard DSV modulation rules when the output of the function block 210 is indeterminate), and passes control to the function block 235.

The function block 235 places the modulated bits into the output buffer to be transferred to the pickup and passes control to an end block 299. This decision sequence (200) has to run once per primary code data or sync byte.

The preceding description is directed to modulation rules for embedding a binary (two-state) second level code. However, given the teachings of the present principles provided herein, one of ordinary skill in this and related arts will readily, comprehend that the present principles are also readily applied to other optical disk modulation rules including, but not limited to, compact disc (CD), high definition digital versatile disc (HD DVD), and Blu-Ray Disc (BD) modulation rules. A multilevel code can be obtained by using the modified modulation rules only in every other case (resulting in a 4 level code) or using a third modulation rule, which could be the usual one, to obtain a 3 level code. For example, in an embodiment having a three level code, function blocks such as block 225 (FIG. 2), 340 (FIGS. 3), and 230 (FIG. 2) may be used for state 0, 1, and 2, respectively.

Figure 3:
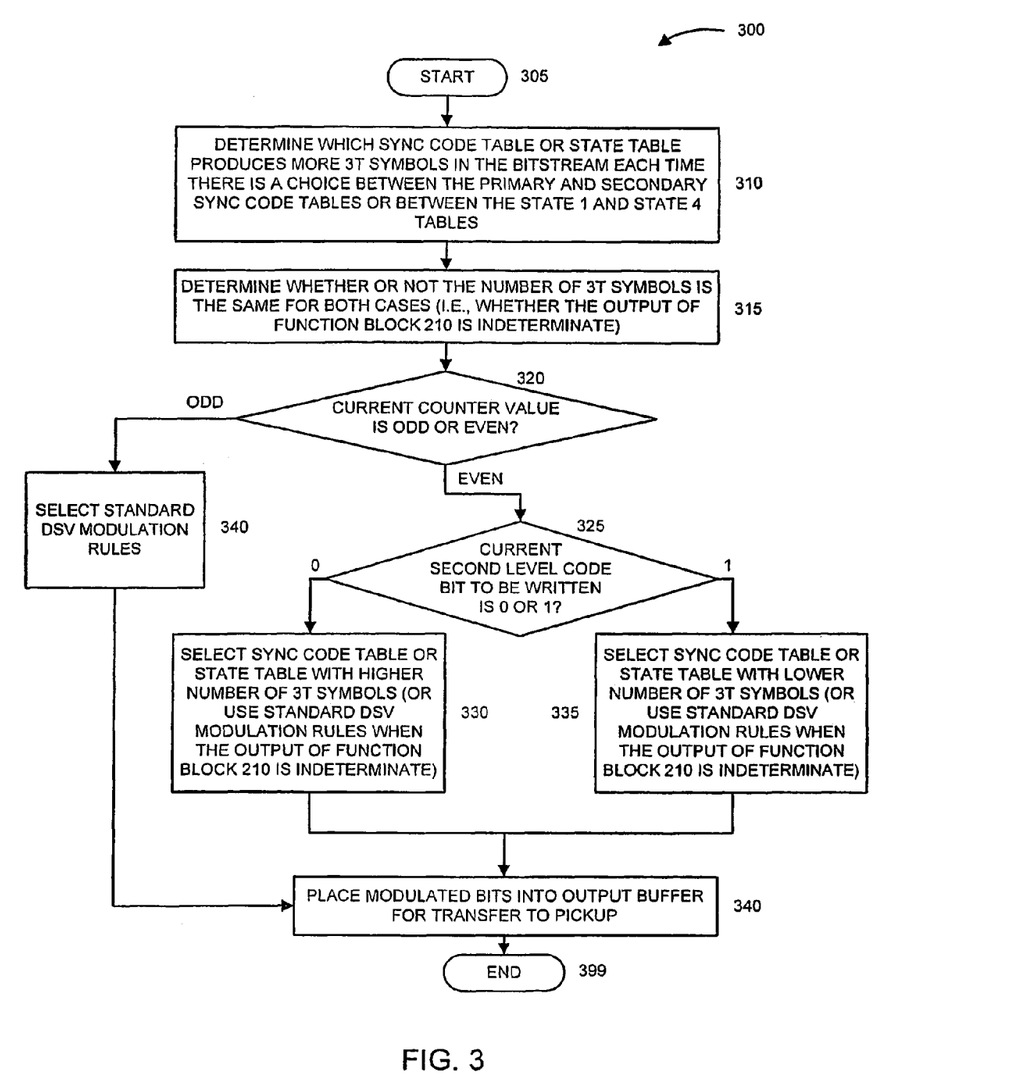
FIG. 3 is a diagram for another exemplary method for encoding second level data on an optical disc without altering the readability of the first level data (main data) in accordance with the present principles.

Turning to FIG. 3, another exemplary method for encoding second level data on an optical disc without altering the readability of the first level data (main data) is indicated generally by the reference numeral 300. The method of FIG. 3 results in the generation of four (4) level code for representing the second level data.

The method 300 includes a start block 305 that initializes a counter and passes control to a function block 310. The function block 310 determines which sync code table or state table produces more 3T symbols in the bitstream each time there is a choice between the primary and secondary sync code tables or between the state 1 and state 4 tables, and passes control to a function block 315. The function block 315 determines whether or not the number of 3T symbols is the same for both cases (i.e., whether the output of the function block 310 was indeterminate), and passes control to a decision block 320. The decision block 320 determines whether or not a current value of the counter is odd or even. If the current value of the counter is odd, then control is passed to a function block 340. Otherwise, if the current value of the counter is even, then control is passed to a decision block 325. The decision block 325 determines whether or not a current second level code bit to be written is a zero (0) or a one (1). If the current second level code bit to be written is a zero, then control is passed to a function block 330. Otherwise, if the current second level code bit to be written is a one, then control is passed to a function block 335. It is to be appreciated that the second level code may optionally include error correction code.

The function block 330 selects the sync code table or the state table with the higher number of 3T symbols (or uses the standard Digital Sum Value (DSV) modulation rules when the output of the function block 310 is indeterminate), and passes control to a function block 345.

The function block 335 selects the sync code table or the state table with the lower number of 3T symbols (or uses the standard DSV modulation rules when the output of the function block 310 is indeterminate), and passes control to the function block 345.

The function block 340 uses the standard DSV modulation rules to modulate the current second level code to be written, and passes control to the function block 345.

The function block 345 places the modulated bits into the output buffer to be transferred to the pickup and passes control to an end block 399. This decision sequence (300) has to run once per primary code data or sync byte.

To detect a binary second level code, the number of 3T symbols are counted and compared to a threshold corresponding to the number of 3T symbols that would appear in the first level code with no second level code and using conventional modulation rules. Alternatively, more complicated statistical properties of the first level code may be determined for the predetermined number of first level code bits. Of course, given the teachings of the present principles provided herein, one of ordinary skill in this and related arts will contemplate these and various other ways in which to detect the second level code embedded in accordance with the present principles, while maintaining the scope of the present principles.

It is advantageous to adjust and align the section of first level code bits used to represent one second level code bit to structures already available in the first level code such as, for example, sync frames, physical sectors, ECC blocks, and so forth. The system/application that checks the correctness of the second level code has to know where and how the second level code is embedded into the first level code, which can be done by storing this information on the disc in an encrypted way, or by obtaining this information by online connections, and so forth.

Figure 4:
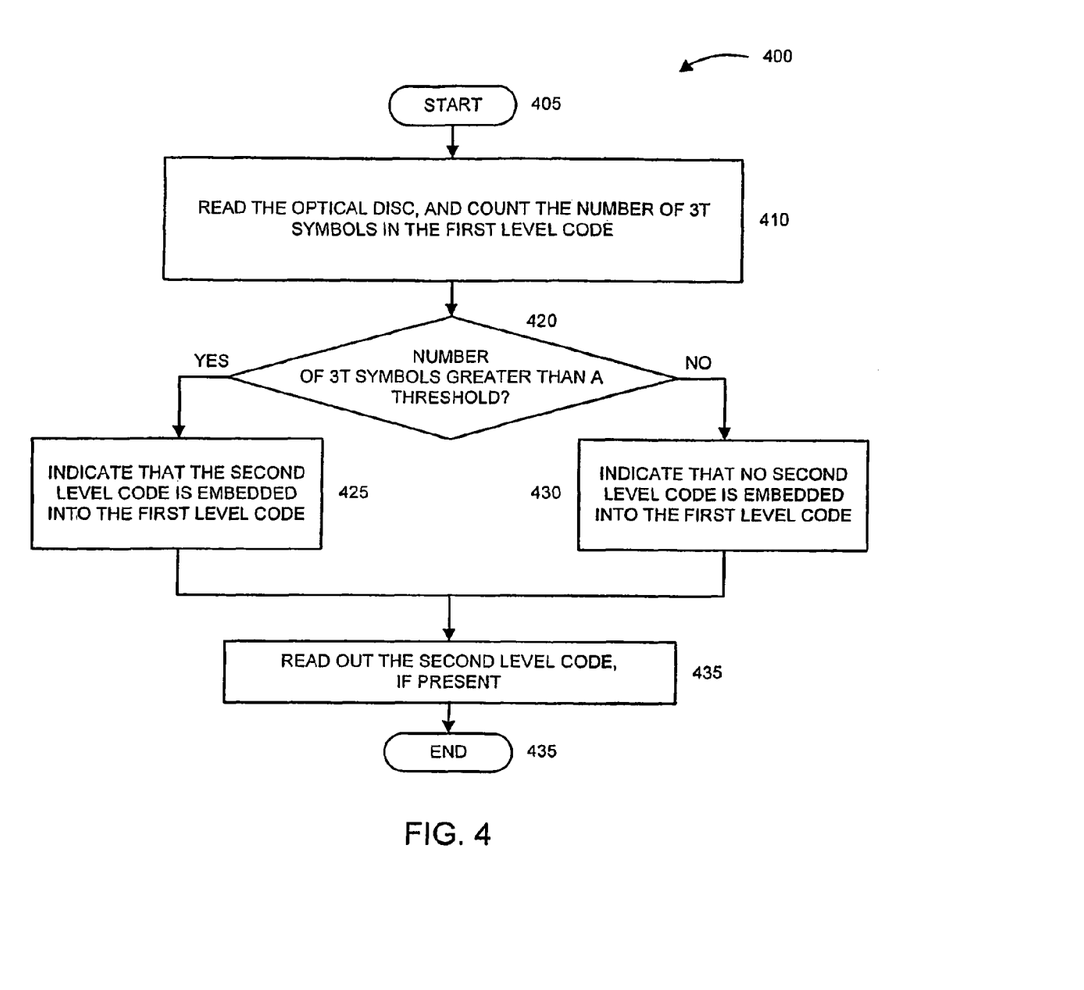
FIG. 4 is a diagram for an exemplary method for detecting if a secondary code is present in accordance with the present principles.

Turning to FIG. 4, an exemplary method for determining whether a second level code has been embedded on an optical disc is indicated generally by the reference numeral 400. The method 400 corresponds to the case when the modulation rules in accordance with the present principles maximize the number of 3T occurrences in a resulting channel bit stream.

The method includes a start block 405 that passes control to a function block 410. The function block 410 reads the optical disc, counts the number of 3T symbols in the first level code, and passes control to a decision block 415. The decision block 415 determines whether or not the number of 3T symbols (counted by function block 410) is greater than a threshold corresponding to the number of 3T symbols that would appear in the first level code with no second level code and using conventional modulation rules. If so, then control is passed to a function block 420. Otherwise, control is passed to a function block 425.

The function block 420 indicates that the second level code is embedded into the first level code, and passes control to a function block 430.

The function block 425 indicates that no second level code is embedded into the first level code, and passes control to the function block 430.

The function block 430 reads out and/or otherwise determines the second level code, if the second level code is indicated as present, and passes control to an end block 435. It is to be appreciated that the reading out of the second level code is based upon stored information that indicates where and how the second level code is embedded into the first level code.

It is to be further appreciated that while the method of FIG. 4 is directed to the case where the modulation rules in accordance with the present principles maximize the occurrence of 3T symbols, other embodiments, as readily determined and implemented by one of ordinary skill in this and related arts given the teachings of the present principles provided herein, may be directed to the case where the modulation rules in accordance with the present principles minimize the occurrence of the 3T symbols. In such a case, decision block 415 would be determining whether the number of 3T symbols is less than the threshold. These and other variations and implementation of the present principles are readily ascertained and implemented by those of ordinary skill in this and related arts given the teachings of the present principles provided herein.

Figure 5:
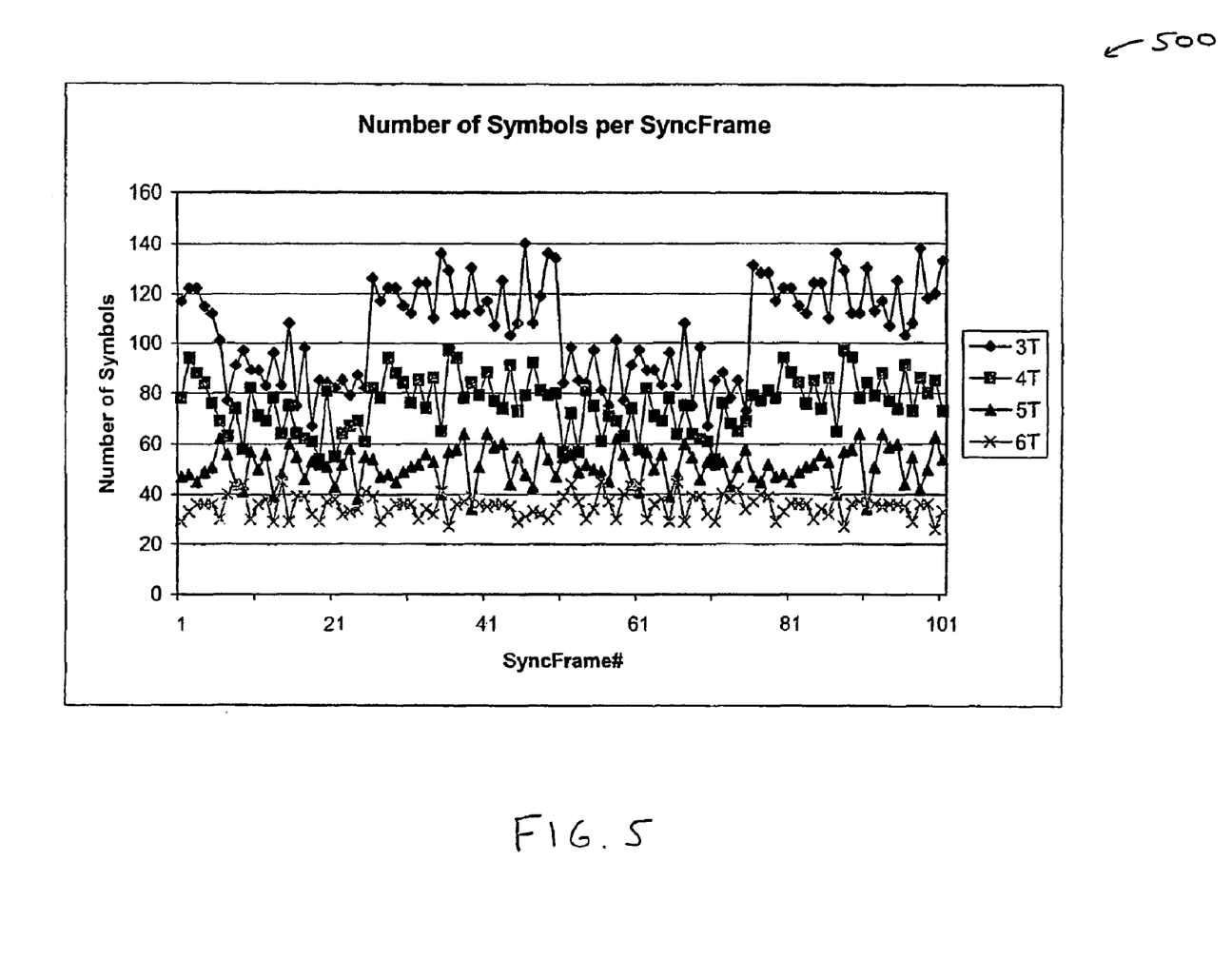
FIG. 5 is a diagram for an exemplary graph for the distribution of runlengths when data modulation rule variation (for minimizing or maximizing 3T occurrences) in accordance with the present principles is applied to a DVD bitstream with a second level bit length corresponding to one sync frame of first level data in accordance with the present principles.

Turning to FIG. 5, an exemplary graph for the distribution of runlengths when data modulation rule variation (for minimizing or maximizing 3T occurrences) in accordance with the present principles is applied to a DVD bitstream with a second level bit length corresponding to one sync frame of first level data is indicated generally by the reference numeral 500. In the graph 500, the horizontal axis denotes the number of consecutive sync frames, and the vertical axis shows the number of symbols with the various runlengths. It is easily seen that the number of 3Ts (white plot) varies between higher and lower values. If the modulation process is conducted as described in the DVD specifications, then the average number of 3Ts per sync frame is approximately 105. The variation of 3T occurrence in one sync frame is pretty large, so the second code bit detection reliability may be low, so that the use of a strong error correction code may be desired in such circumstances. If the number of first level code bits representing one second level code bit is chosen to be larger, then those variations average out, resulting in a higher second level bit detection reliability with reduced error correction code requirements.

These and other features and advantages of the present invention may be readily ascertained by one of ordinary skill in the pertinent art based on the teachings herein. It is to be understood that the teachings of the present invention may be implemented in various forms of hardware, software, firmware, special purpose processors, or combinations thereof.

Most preferably, the teachings of the present invention are implemented as a combination of hardware and software. Moreover, the software may be implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present invention is programmed. Given the teachings herein, one of ordinary skill in the pertinent art will be able to contemplate these and similar implementations or configurations of the present invention.

Although the illustrative embodiments have been described herein with reference to the accompanying drawings, it is to be understood that the present invention is not limited to those precise embodiments, and that various changes and modifications may be effected therein by one of ordinary skill in the pertinent art without departing from the scope or spirit of the present invention. All such changes and modifications are intended to be included within the scope of the present invention as set forth in the appended claims.

The invention claimed is:

1. An apparatus comprising:
   a modulator for modulating a first level code to obtain a channel bit stream representative of the first level code and having a second level code embedded therein, the modulating enabling different length distributions of first and second encoding regions representing binary or multilevel data of the second level code.

2. The apparatus of claim 1, wherein the length distributions of the first and second encoding regions are pit-land length distributions that have different statistical properties and wherein different ones of the different statistical properties are used depending upon whether a current second level bit to be written is a zero or a one.

3. The apparatus of claim 1, wherein the length distributions of the first and second encoding regions are pit-land length distributions that have different statistical properties and the different statistical properties of pit-land length distributions at least one of maximize and minimize a number of 3T symbols in the first level code having the second level code embedded therein.

4. The apparatus of claim 1, wherein the modulator modulates the first level code by determining which of a primary sync code table or a secondary sync code table one of maximizes or minimizes a number of 3T symbols in the first level code having the second level code embedded therein, and selects one of the primary sync code table or the secondary sync code table to modulate the first level code depending upon whether a current second level bit to be written is a zero or a one.

5. The apparatus of claim 1, wherein the modulator utilizes standard modulation rules to write the current second level bit, when a maximization or a minimization of the number of 3T symbols is indeterminate between the primary sync code table and the second sync code table.

6. The apparatus of claim 1, wherein the modulator alternates use of modulation rules respectively having different statistical properties of the first and second encoding region length distributions and standard modulation rules for every other second level code bit to be written to provide a four-level data for the second level code.

7. The apparatus of claim 1, wherein the modulator modulates the first level code by determining which of a state 1 table or a state 4 table one of maximizes or minimizes a number of 3T symbols in the first level code having the second level code embedded therein, and selects one of the state 1 table or the state 4 table to modulate the first level code depending upon whether a current second level bit to be written is a zero or a one.

8. The apparatus of claim 1, wherein the modulator utilizes standard modulation rules to write the current second level bit, when a maximization or a minimization of the number of 3T symbols is indeterminate between the state 1 table and the state 4 table.

9. The apparatus of claim 1, wherein the modulator adds error correction code in the second level code during the embedding thereof in the first level code.

10. The apparatus of claim 9, wherein a strength of the error correction code is based upon a bit length of the second level code.

11. A method comprising the step of:
    modulating a first level code to obtain a channel bit stream representative of the first level code and having a second level code embedded therein, said modulating using different length distributions of first and second encoding regions representing binary or multilevel data of the second level code.

12. The method of claim 11, wherein the first and second encoding regions distributions are pit-land length distributions that have different statistical properties and wherein different ones of the different statistical properties are used depending upon whether a current second level bit to be written is a zero or a one.

13. The method of claim 11, wherein the first and second encoding regions distributions are pit-land length distributions that have different statistical properties and wherein the different statistical properties of pit-land length distributions at least one of maximize and minimize a number of 3T symbols in the first level code having the second level code embedded therein.

14. The method of claim 11, wherein said modulating step modulates the first level code by determining which of a primary sync code table or a secondary sync code table one of maximizes or minimizes a number of 3T symbols in the first level code having the second level code embedded therein, and selects one of the primary sync code table or the secondary sync code table to modulate the first level code depending upon whether a current second level bit to be written is a zero or a one.

15. The method of claim 11, wherein said modulating step utilizes standard modulation rules to write the current second level bit, when a maximization or a minimization of the number of 3T symbols is indeterminate between the primary sync code table and the second sync code table.

16. The method of claim 11, wherein said modulating step alternates use of the modulation rules respectively having different statistical properties of pit-land length distributions and standard modulation rules for every other second level code bit to be written to provide a four-level data for the second level code.

17. The method of claim 11, wherein said modulating step modulates the first level code by determining which of a state 1 table or a state 4 table one of maximizes or minimizes a number of 3T symbols in the first level code having the second level code embedded therein, and selects one of the state 1 table or the state 4 table to modulate the first level code depending upon whether a current second level bit to be written is a zero or a one.

18. The method of claim 11, wherein said modulating step utilizes standard modulation rules to write the current second level bit, when a maximization or a minimization of the number of 3T symbols is indeterminate between the state 1 table and the state 4 table.

19. The method of claim 11, wherein said modulating step further comprises adding error correction code in the second level code during the embedding thereof in the first level code.

20. The method of claim 19, wherein a strength of the error correction code is based upon a bit length of the second level code.

* * * * *